United States Patent [19]

Schmid

[11] 3,985,699

[45] Oct. 12, 1976

[54] METHOD OF MANUFACTURING MOULD MEMBERS OF POLYURETHANE-BONDED GRANULAR MATERIAL

[75] Inventor: Herman Pius Schmid, Karlskoga, Sweden

[73] Assignee: AB Bofors, Bofors, Sweden

[22] Filed: June 2, 1975

[21] Appl. No.: 583,321

[30] Foreign Application Priority Data

June 7, 1974 Sweden.............................. 7407505

[52] U.S. Cl...................... 260/31.2 N; 260/32.8 N; 260/33.6 UB; 260/33.8 UB; 260/37 N
[51] Int. Cl.²......................................... C08K 3/35
[58] Field of Search................ 164/43; 260/DIG. 40, 260/37 N, 31.2 N, 32.8 N, 33.6 UB, 33.8 UB

[56] References Cited

UNITED STATES PATENTS

| | | | |
|---|---|---|---|
| 2,374,136 | 4/1945 | Rothrock | 260/37 N X |
| 3,063,964 | 11/1962 | Khawam | 260/47 |
| 3,409,579 | 11/1968 | Robins | 260/30.4 |
| 3,428,110 | 2/1969 | Walker et al. | 164/43 |
| 3,429,848 | 2/1969 | Robins | 260/38 |
| 3,432,457 | 3/1969 | Robins | 260/30.4 |
| 3,441,523 | 4/1969 | Dwyer et al. | 260/2.5 |
| 3,450,653 | 6/1969 | McClellan | 260/18 |
| 3,485,797 | 12/1969 | Robins | 260/38 |
| 3,538,040 | 11/1970 | Grozen | 260/37 |
| 3,637,577 | 1/1972 | Guyer et al. | 260/38 |
| 3,645,942 | 2/1972 | Brown et al. | 260/18 |
| 3,676,392 | 7/1972 | Robins | 260/38 |
| 3,679,631 | 7/1972 | Mozes | 260/47 CB |
| 3,702,316 | 11/1972 | Robins | 260/38 |
| 3,725,355 | 4/1973 | Parrish et al. | 260/27.5 AP |
| 3,745,139 | 7/1973 | Kachur | 260/38 |

FOREIGN PATENTS OR APPLICATIONS

| | | |
|---|---|---|
| 949,086 | 2/1964 | United Kingdom |
| 971,974 | 10/1964 | United Kingdom |
| 1,133,834 | 11/1968 | United Kingdom |
| 1,136,307 | 12/1968 | United Kingdom |

*Primary Examiner*—Donald E. Czaja
*Assistant Examiner*—S. M. Person
*Attorney, Agent, or Firm*—Pollock, Vande Sande & Priddy

[57] ABSTRACT

A method for manufacturing mould members which comprises mixing together a granular material such as sand; a polyurethane forming cold-hardenable bonding agent composition; and a solvent for the bonding agent composition wherein the solvent has an evaporation rate which corresponds to a reference value of 100–800 when the normal butyl acetate has a value of 100 and pure acetone has a reference value of 1,000; shaping the mixture into a predetermined form; and blowing gaseous amine through the mixture to catalyze the formation of the polyurethane bonding agent.

13 Claims, No Drawings

METHOD OF MANUFACTURING MOULD MEMBERS OF POLYURETHANE-BONDED GRANULAR MATERIAL

The present invention relates to a method of manufacturing mould members of granular material mixed with a lesser quantity of cold-hardening polymeric bonding agent.

Mixtures of materials of this type are primarily used for the manufacture of cores for casting of metal. The granular material then used is a fine and uniform sand, while the bonding agent hitherto most commonly used has consisted of a mixture of phenolic resin and a polyisocyanate, the reaction between which has been catalyzed by gaseous trimethyl amine being blown through the mixture of sand and resin when the moulding has been completed.

Recently, another type of core-bonding agent has also been used, the polyol part of which consists of aliphatic or aromatic polyethers combined with bisphenols and/or other linked phenols, and the reaction of which with the isocyanate part of the bonding agent mixture, as in the case of the first-mentioned type of bonding agent, has been catalyzed by the addition of gaseous trimethyl amine. This latter type of bonding agent is described more in detail in our own Swedish patent application No. 12377/72.

The general method of making cores of particle-shaped material and a cold-hardening polymeric bonding agent is usually called the cold-box method. This method has come to be widely used, particularly when manufacturing very large series of metal castings. Within the automotive industry, for instance, the method is used to a very great extent.

However, each and every one of the bonding agents briefly described have certain disadvantages. The phenolic resin polyisocyanate-based core bonding agents thus give an unacceptably high residual phenol content in the used sand, with consideration to present-day pollution requirements, while the core bonding agent made of polyethers, bisphenols and polyisocyanate have hitherto provided to harden much more slowly and have a somewhat lower initial strength, which has made it difficult to easily supersede a phenolic resin polyisocyanate bonding agent with a polyether bisphenol polyisocyanate bonding agent in modern core moulding machines set for a very high rate of production.

By the expression initial strength is meant in this connection the strength of the product immediately after the feed of the gaseous catalyst has been discontinued. Usually the catalyst gas has been fed for about 10–20 seconds, which should thus correspond to the hardening time.

If no special solvents are added, most bonding agent mixtures of the type phenolic resin-polyisocyanate or polyether bisphenols polyisocyanate obtain a viscosity that makes it difficult to mix the bonding agent mixture with a moulding material such as fine-grained moulding sand. In order to obtain an appropriate viscosity, solvents of various kinds have therefore been added, and ethers, as well as ketones and esters have then been used. Tertiary alcohols have then also possibly been used for this purpose. Hitherto, the solvent has not been considered to have any effect on the mixtures of bonding agent other than to lower their viscosity sufficiently so that they can be mixed with the moulding sand. In the cases when the solvents have been added, the quantities have been very low, and at all events have not exceeded 0.6 %. However, we have now been able to establish, quite surprisingly, that both the evaporation rate of the solvent and the percental quantity of the solvent is of essential importance through the hardening rate of such cold-hardening polymer-linked mixtures of bonding agent, and the initial strength of the cores made thereof. We have also been able to establish that an optimal combination between a high hardening rate and good initial strength of the bonding agent mixture can be obtained if the quantity of solvent is adjusted with consideration to the evaporation rate of the solvent in question.

As reference values when determining an appropriate evaporation rate for solvents or mixtures of solvents, we have used the figure 100 for normal butyl acetate and the figure 1000 for acetone, which are the reference values generally used when making comparisons between the evaporation rate of different substances.

According to our investigations, the maximum combination of hardening rate and initial strength is obtained if 0.5 – 3 % by weight, counted on the dry quantity of sand, is added of a solvent or a mixture of solvent with an evaporation rate between the reference values of 100 and 800 according to the above-mentioned definition. The values indicated are primarily applicable to moulding sand with a means particle diameter of between 0.15 and 0.30 mm, i.e. the usual types of moulding sand. Our tests have moreover shown that a percentally larger quantity of a solvent or solvent mixture with comparatively rapid evaporation is required than if a solvent or solvent mixture that evaporates more slowly is used. It has thus proved that when using isopropyl acetate which evaporates comparatively rapidly (reference value 400 – 450) the best results were obtained with 2.5 – 3 % by weight of solvent, while if isobutyl acetate is used, which evaporates comparatively slowly (reference value 100 – 135) it proved that the best results were obtained with a solvent content of 0.5 – 1 % by weight.

Solvent contents below the above-mentioned values have proved to give generally poorer strength, while an altogether too high content of solvent has proved to make the gassing of the moulded mixture of sand and bonding agent more difficult, and has thereby made it difficult to fully utilize the gaseous triethyl amine catalyst, whereby there is also a risk that the polymerization reaction has not been carried out completely.

The solvent contents that can come into question according to the present invention are considerably higher than those previously used for mixtures of moulding sand and bonding agent, where the solvent has been added only in order to provide a workable viscosity of the actual bonding agent added. Previously, the solvent added, counted on the quantity of dry sand, as mentioned above, has corresponded to a maximum of 0.6 % by weight.

It has also proved, quite surprisingly, that through the above-mentioned optimizing of the type and quantity of solvent, it has been possible to reduce the total quantity of pure polymer bonding agent from the previously used approx. 1.5 % by weight of pure polymer bonding agent counted on the quantity of sand to approx. 0.5 % by weight, without substantially reducing the strength of the moulded polymerized product. On the contrary, it has proved that this reduction of the content of bonding agent has had a positive influence on the initial strength of the moulded product, provided that the above-mentioned rules for the choice of type and quantity of solvent have been followed.

As examples of evaporation values for various solvents that can be used it may be mentioned that:

| | |
|---|---|
| ethyl acetate has a reference value of | 475 |
| isopropyl acetate has a reference value of | 428 |
| methyl-n-propyl-ketone has a reference value of | 320 |
| ethyl-n-butylethylene has a reference value of | 650 |

In this connection, it can also be appropriate to use mixtures of different solvents, and the rules outlined above have proved to be applicable also in these cases, provided that the mean evaporation value of the solvent mixture is within the limits indicated. Through appropriate mixing, interesting mixtures of solvents for the purpose can be obtained, e.g. through a mixture of trichloroethylene, which has an appropriate evaporation rate of 620, but which in itself is a poor solvent for polyuretanes, and ethyl acetate, with the evaporation rate of 475. Such a mixture of trichloroethylene and ethyl acetate would, for instance, be non-combustible, which is a substantial advantage.

Also mixtures of different solvents with comparatively great differences between their evaporation rates are conceivable, provided that the mean evaporation rate of the mixture is within the limits indicated.

The method according to the invention has been defined in more detail in the following claims, and a number of examples have been given.

The polyol part of the mixture of bonding agent can consist of one or several aliphatic or aromatic polyethers, together with the hydroxy compounds that initiate the catalyzation, which consists of one or several aliphatic or aromatic compounds with at least 2 OH groups, which direct or via a methylene group are linked to a carbon atom in the aromatic core, but can also consist of a phenol derivative such as bisphenol or some other di or trivalent phenol or a phenolic resin.

Inasmuch as it has become possible through the present invention to add considerably greater quantities of solvent than previously, the own viscosity of the polymeric bonding agent has become of minor importance, and it has thereby become possible to use up to 100 % of a phenol derivative or an aliphatic polyol of the previously mentioned types as the polyol part of the bonding agent.

EXAMPLE 1

20 % polyether (Voranol) with a molecular weight of 5000 and 17.5 % bisphenol-A was dissolved in 62.5 % ethyl acetate. The mixture thereby obtained contained 1.67 milliequivalents of hydroxyl per gramme.

29 grammes of this mixture was mixed carefully with 1960 grammes of sand, after which the mixture thus obtained was reacted with 11 grammes of diphenyl methane diisocyanate, which contained 10 % mineral terpentine. The isocyanate contained 6.6 milliequivalents of NCO per gramme, which corresponded to an amine equivalent of 151.5.

The calculated NCO-hydroxyl balance is to correspond to 1,5 after complete mixing with the sand. The mixing time was approx. 2 minutes. Thereafter, the still entirely loose mixture of sand was filled into a core mould of a type well known within the foundry branch, after which the mixture of sand was hardened by triethyl amine vapour being blown through the sand with compressed air. After 10 seconds of gassing, the initial strength of the hardened product was determined. This corresponded to between 3 and 5 kg/cm$^2$. After 1 hour of storage, the product had obtained a final strength of approx. 8–10 kp/cm$^2$.

Thus, with this comparatively low content of solvent of roughly 0.9 % no extremely high initial or final strength was obtained. The value of the invention will be noted if the values attained according to example 1 are compared with those attained according to example 2.

EXAMPLE 2

29 g of the same mixture of polyether, bisphenol-A and ethyl acetate as per example 1 was mixed with 30 g of ethyl acetate, after which the mixture thus obtained was mixed with 1960 grammes of sand, reacted with diphenyl methane diisocyanate as per example 1, and moulded and hardened in the same way as according to example 1. The initial strength then obtained was 18–19 kp/cm$^2$, while the final strength, after one hour's storage was 50–51 kp/cm$^2$.

This example illustrates, at a comparison with example 1, the improved strength properties that can be achieved through an increase of the content of solvent from approx. 0.9 % to 2.5 %.

EXAMPLE 3

10 % polyether (Voranol) with a molecular weight of 5000 was mixed with 27.5 % bisphenol-A and 62.5 % isopropyl acetate. The mixture thereby obtained contained 2.48 milliequivalents of hydroxyl per gramme.

25.58 grammes of this mixture was mixed with 1960 grammes of sand, after which 14.42 grammes of isocyanate was added, as per example 1. The total mixing time was 2 minutes. Of the entirely loose mixture of sand thus obtained, test bars of a standard type were moulded, which were hardened by means of gassing with triethyl amine as per example 1.

The initial strength of the test pieces obtained after 10 seconds was 2 – 3 kp/cm$^2$, and their final strength after one hour's storage was 10 – 14 kp/cm$^2$.

EXAMPLE 4

This test is to be compared with example 3. The test was made entirely as per example 3, with the exception that the polyether-bisphenol solution mixture was diluted with a further quantity of 30 g of isopropyl acetate before it was mixed into the sand.

After only 5 seconds gassing, an initial strength of 30 – 32 kp/cm$^2$ was obtained, and after one hour the final strength was 52 – 54 kp/cm$^2$.

I claim:
1. A method for manufacturing mould members which comprises:
   A. mixing together:
      1. a granular material;
      2. 0.5 to 1.5% by weight based on the weight of said granular material of a polyurethane forming cold-hardenable bonding agent composition of polyisocyanate and a polyhydroxy member selected from the group consisting of aliphatic polyether, aromatic polyether, phenol derivative and mixtures thereof; and
      3. 0.5 to 3% by weight based upon the weight of said granular material of a solvent for dissolving said bonding agent composition, wherein said solvent has an evaporation rate which corresponds to a reference value of 100–800 when the normal butyl acetate has a reference value of 100 and pure acetone has a reference value of 1,000;

B. shaping mixture obtained from step (A) above into a predetermined form; and

C. blowing gaseous triethylamine through the shaped mixture from step (B) to thereby catalyze the formation of the polyurethane forming bonding agent.

2. A method according to claim 1, characterized in that, the polyhydroxy material consists essentially of one or several aliphatic or aromatic polyethers together with a hydroxy compound for initiating the catalyzation, which consists of an aromatic compound with at least 2 OH groups, which direct or via a methylene group are linked to a carbon atom in the aromatic nucleus.

3. A method according to claim 1 characterized in that up to 100 % of the polyhydroxy part of the bonding agent added consists of a phenol derivative.

4. A method according to claim 1 characterized in that solvent with a high evaporation reference value within the range of 100 – 800 indicated in claim 1 is added in a quantity corresponding to a high % by weight content within the % by weight limits specified in claim 1 of 0.5 – 3 % by weight while the solvent with the low reference value within the corresponding reference range has a corresponding low % by weight content within the % by weight limits indicated.

5. The method of claim 1 wherein said granular material is sand.

6. The method of claim 5 wherein said sand has a mean particle diameter between 0.15 and 0.30 mm.

7. The method of claim 1 wherein said solvent is ethyl acetate.

8. The method of claim 1 wherein said solvent is isopropyl acetate.

9. The method of claim 1 wherein said solvent is methyl-n-propyl ketone.

10. The method of claim 1 wherein said solvent is ethyl-n-butylethylene.

11. The method of claim 1 wherein said solvent is a mixture of trichloroethylene and ethyl acetate.

12. The method of claim 3 wherein said phenol derivative is selected from the group consisting of a divalent phenol, trivalent phenol, phenolic resin and mixtures thereof.

13. The method of claim 3 wherein said phenol derivative is bisphenol.

* * * * *